(12) United States Patent
Reitinger et al.

(10) Patent No.: US 11,708,126 B2
(45) Date of Patent: Jul. 25, 2023

(54) SWINGARM CONCENTRIC MOTOR DRIVE FOR ELECTRIC MOTORCYCLE

(71) Applicant: LiveWire EV, LLC, Milwaukee, WI (US)

(72) Inventors: Samuel Nicholas Reitinger, Wauwatosa, WI (US); Eric Konkel, Hartland, WI (US); Mark Gales, Franklin, WI (US); Jared Peter Thede, Cedarburg, WI (US)

(73) Assignee: LiveWire EV, LLC, Milwaukee, WI (US)

( * ) Notice: Subject to any disclaimer, the term of this patent is extended or adjusted under 35 U.S.C. 154(b) by 0 days.

(21) Appl. No.: 17/678,627

(22) Filed: Feb. 23, 2022

(65) Prior Publication Data

US 2022/0177070 A1    Jun. 9, 2022

Related U.S. Application Data

(63) Continuation of application No. 16/710,392, filed on Dec. 11, 2019, now Pat. No. 11,260,934.

(60) Provisional application No. 62/789,302, filed on Jan. 7, 2019.

(51) Int. Cl.
*B62K 25/20* (2006.01)
*B62M 7/04* (2006.01)

(52) U.S. Cl.
CPC .............. *B62K 25/20* (2013.01); *B62M 7/04* (2013.01); *B62K 2204/00* (2013.01)

(58) Field of Classification Search
CPC ....... B62K 25/20; B62K 2204/00; B62M 7/04
See application file for complete search history.

(56) References Cited

U.S. PATENT DOCUMENTS

| 5,501,292 | A  | 5/1996  | Kawashima et al. |
| 6,326,765 | B1 | 12/2001 | Hughes et al. |
| 6,341,660 | B1 | 1/2002  | Schiller |
| 8,789,640 | B2 | 7/2014  | Matsuda |
| 8,973,689 | B2 | 3/2015  | Plazotta et al. |

(Continued)

FOREIGN PATENT DOCUMENTS

| DE | 102014215936 A1 | 3/2015 |
| DE | 102014015306 A1 | 4/2016 |

(Continued)

OTHER PUBLICATIONS

Non Patent Literature, Voltra, Dan Anderson Copyright 2009 webpage: https://vignette.wikia.nocookie.net/openmotox/images/c/c2/DA_Voltra3.jpg/revision/latest?cb=20100506113837 (9 pages).

(Continued)

*Primary Examiner* — Tony H Winner
(74) *Attorney, Agent, or Firm* — Michael Best & Friedrich LLP

(57) ABSTRACT

A motorcycle includes an electric motor having an output shaft defining a motor axis, a rear wheel drivably coupled to the electric motor to propel the motorcycle, a swingarm rotatably supporting the rear wheel, and a frame. The frame includes a main frame member supporting the electric motor and the swingarm. A case of the electric motor is a stressed member of the frame between the main frame member and the swingarm. The swingarm is coupled to the case of the electric motor to define a swingarm pivot axis that is co-axial with the motor axis.

30 Claims, 7 Drawing Sheets

(56) References Cited

U.S. PATENT DOCUMENTS

| | | | |
|---|---|---|---|
| 9,027,694 | B2 | 5/2015 | Matsuda |
| 9,132,878 | B2 | 9/2015 | Matsuda |
| 9,211,934 | B2 | 12/2015 | Eguchi |
| 9,238,495 | B2 | 1/2016 | Matsuda |
| 9,238,497 | B2 | 1/2016 | Matsuda |
| 9,278,725 | B2 | 3/2016 | Matsuda |
| 9,308,966 | B2 | 4/2016 | Kosuge et al. |
| 9,821,882 | B2 | 11/2017 | Matsuda |
| 9,821,883 | B2 | 11/2017 | Blasco Gracia et al. |
| 9,840,306 | B2 | 12/2017 | Matsuda |
| 10,259,530 | B2 | 4/2019 | Matsuda |
| 11,260,934 | B2 | 3/2022 | Reitinger et al. |
| 2003/0213632 | A1 | 11/2003 | Schless |
| 2004/0036251 | A1 | 2/2004 | Baldwin |
| 2013/0032424 | A1 | 2/2013 | Sand |
| 2013/0168172 | A1 | 7/2013 | Buell et al. |
| 2013/0270021 | A1 | 10/2013 | Kubanek et al. |
| 2015/0251540 | A1 | 9/2015 | Matsuda |
| 2020/0231241 | A1 | 7/2020 | Knitt et al. |
| 2021/0016852 | A1 | 1/2021 | Nesbitt, III |

FOREIGN PATENT DOCUMENTS

| | | |
|---|---|---|
| EP | 2543130 A1 | 1/2013 |
| EP | 2143627 A1 | 9/2013 |
| EP | 2670655 B1 | 11/2013 |
| EP | 2905167 B1 | 8/2015 |
| EP | 2905168 A2 | 8/2015 |
| EP | 2799325 B1 | 8/2016 |
| EP | 2799319 B1 | 11/2016 |
| EP | 2799321 B1 | 11/2016 |
| EP | 3088288 A2 | 11/2016 |
| EP | 3049267 B1 | 1/2018 |
| EP | 2905166 B1 | 3/2018 |
| EP | 2905161 B1 | 3/2019 |
| ES | 2532651 A1 | 3/2015 |
| JP | S5180848 U | 6/1976 |
| JP | 3152392 B2 | 4/2001 |
| JP | 5700823 B2 | 4/2015 |
| JP | 5860544 B2 | 2/2016 |
| JP | 5889422 B2 | 3/2016 |
| JP | 5898778 B2 | 4/2016 |
| JP | 5923115 B2 | 5/2016 |
| JP | 6002233 B2 | 10/2016 |
| JP | 2016203954 A | 12/2016 |
| JP | 6183089 B2 | 8/2017 |
| NL | 2017515 B1 | 3/2018 |
| NL | 2018466 B1 | 3/2018 |

OTHER PUBLICATIONS

Non Patent Literature, Voltra by Dan Anderson, webpage: Posted Nov. 25, 2009 https://www.coroflot.com/DanAnderson/Voltra-Motorcycle—(10 pages).

Non Patent Literature, Zero SR/F (2019) Reveal and Specs Visordown, By Simon Hancocks, Feb. 25, 2019 Webpage: https://www.visordown.com/news/new-bikes/zero-srf-2019-reveal-and-specs (3 pages).

Non Patent Literature, Zero SR/F (2019) Review, Evans Brasfield, Feb. 25, 2019 Webpage: https://www.motorcycle.com/manufacturer/zero/exclusive-2019-zero-sr-f-review-first-ride.html (19 pages).

Non Patent Literature, Mission Motors, Mission One, The World's fastest Production Electric Motorcycle, Jan. 3, 2010, Webpage:https://www.treehugger.com/cars/mission-one-by-mission-motors-the-worlds-fastest-production-electric-motorcycle.html (5 Pages).

Non Patent Literature, The Electric Chronicales: Power in Flux, Motorczysz Frame, Feb. 4, 2009, Webpage: https://evmc2.wordpress.com/2010/01/03/motoczysz-frame/ (1 Page).

Non Patent Literature, HomeArticlesDailies, MotoCzysz Electric D1g1tal Dr1ve: plug-and-play 100 HP electric powertrain, Feb. 27, 2010, Webpage: MotoCzysz Electric D1g1tal Dr1ve: plug-and-play 100 HP electric powertrain, (5 Pages).

Non Patent Literature, The Verge, Mar. 28, 2019, Webpage: https://www.theverge.com/2019/3/28/18286072/lighting-strike-electric-motorcycle-specs-price, (4 Pages).

Extended Search Report issued from the European Patent Office for related Application No. 20150188.9 dated Apr. 14, 2020 (11 Pages).

SWINGARM CONCENTRIC MOTOR DRIVE FOR ELECTRIC MOTORCYCLE

CROSS-REFERENCE TO RELATED APPLICATIONS

This application is a continuation of co-pending U.S. patent application Ser. No. 16/710,392, filed Dec. 11, 2019, which claims priority to U.S. Provisional Patent Application No. 62/789,302, filed on Jan. 7, 2019, the entire contents of both of which are incorporated by reference herein.

BACKGROUND

The present invention relates to vehicles, and more particularly relates to motorcycles having a swingarm rear suspension and an electric drive motor.

SUMMARY

In one aspect, the invention provides a motorcycle including an electric motor having an output shaft defining a motor axis, a rear wheel drivably coupled to the electric motor to propel the motorcycle, a swingarm rotatably supporting the rear wheel, and a frame. The frame includes a main frame member supporting the electric motor and the swingarm. A case of the electric motor is a stressed member of the frame between the main frame member and the swingarm. The swingarm is coupled to the case of the electric motor to define a swingarm pivot axis that is co-axial with the motor axis.

In another aspect, the invention provides a motorcycle including an electric motor operable to propel the motorcycle, wherein a case of the electric motor enclosing a rotor thereof is a stressed frame member of the motorcycle. A drivetrain of the motorcycle includes a drive sprocket rotatable by the electric motor, a driven sprocket coupled to a rear wheel of the motorcycle, and an endless drive member extended between the drive sprocket and the driven sprocket. A swingarm supports the rear wheel, and a pivot axis of the swingarm on the motorcycle is also the axis of rotation of both the drive sprocket and the rotor of the electric motor.

DETAILED DESCRIPTION

Before any aspects of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
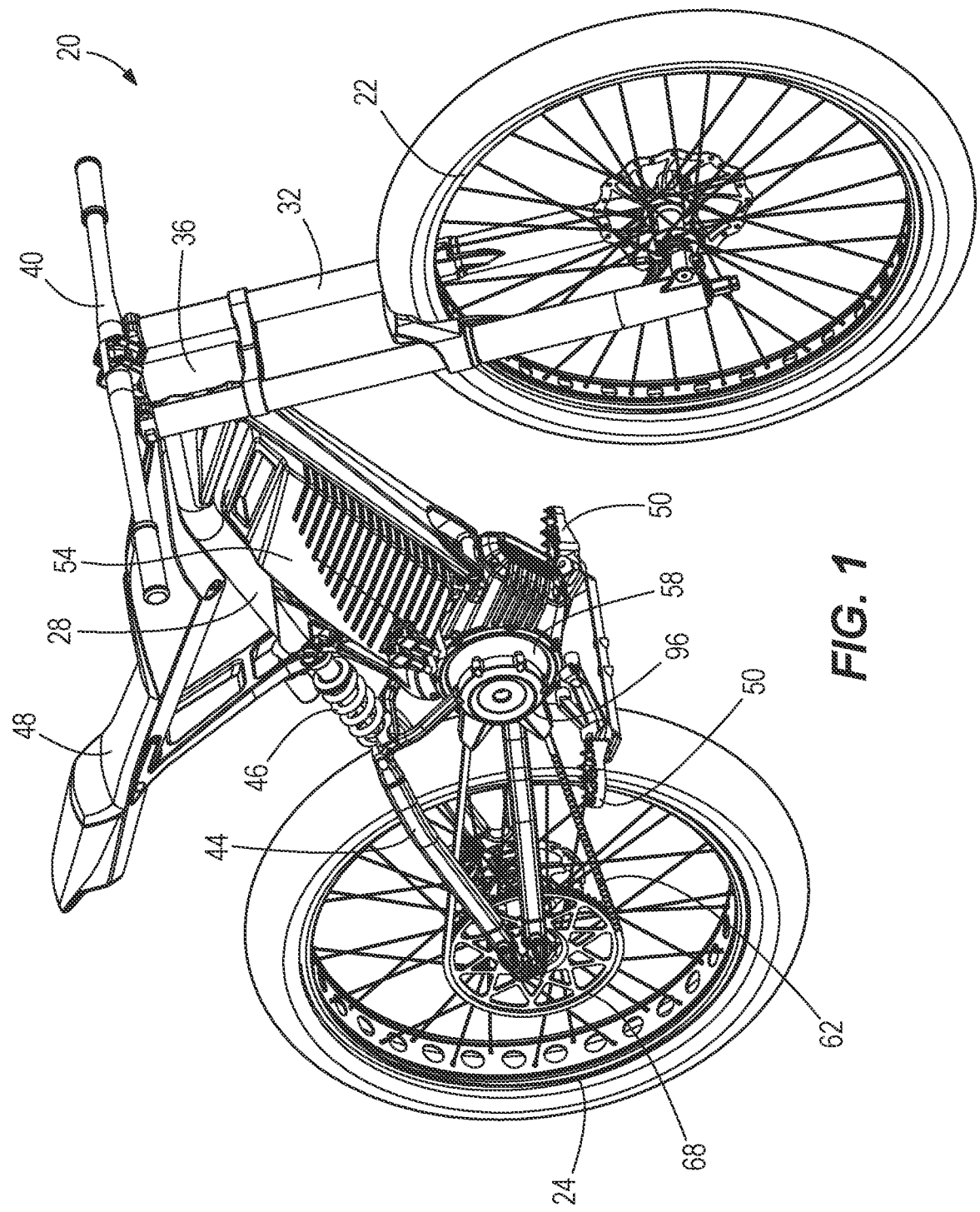
FIG. 1 is a perspective view of a motorcycle according to one embodiment.
Figure 4:
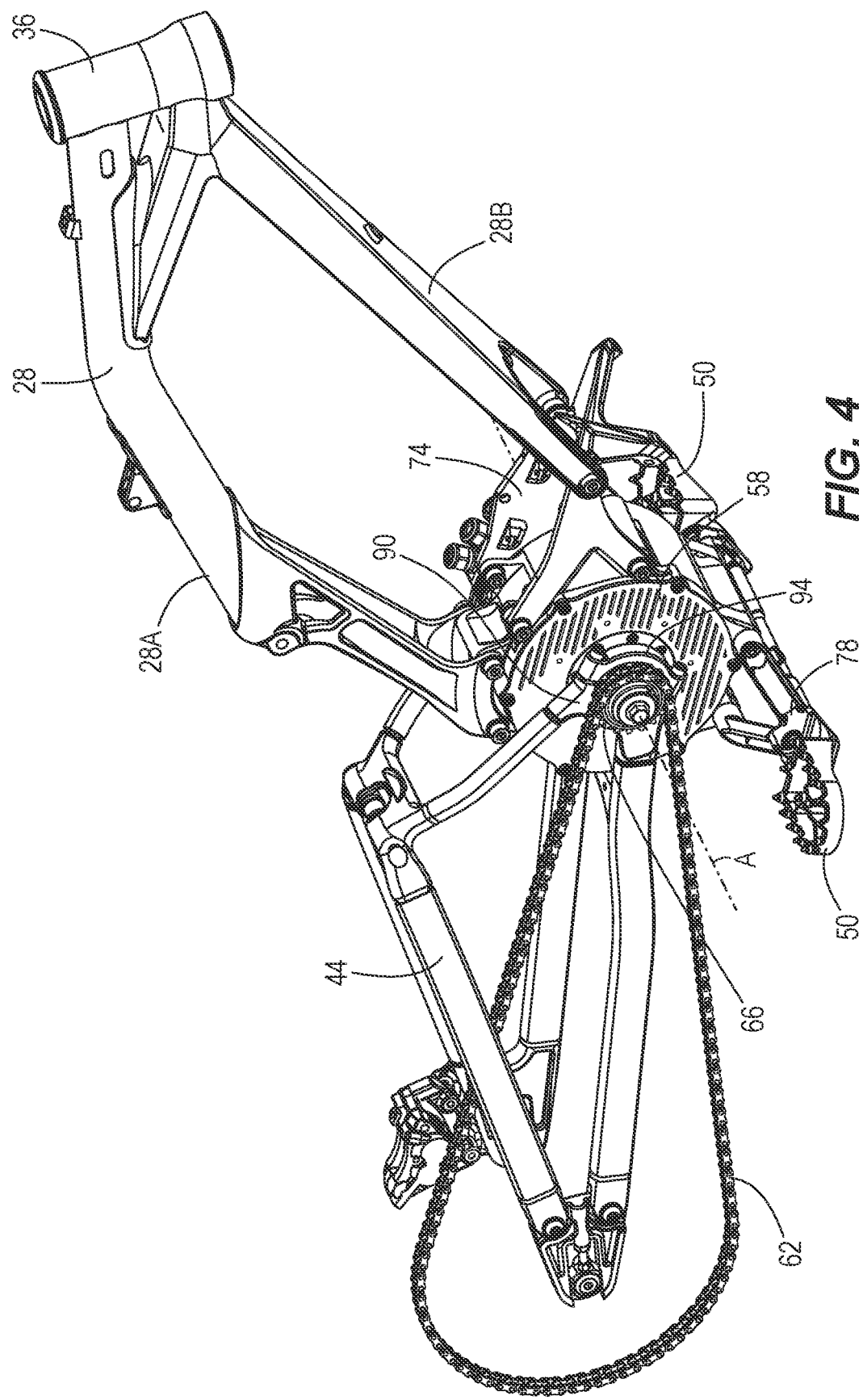
FIG. 4 is a perspective view of a portion of the motorcycle of FIG. 1, including a motor, a frame, and a swingarm.

FIG. 1 illustrates a motorcycle 20 according to one embodiment of the present disclosure. The motorcycle 20 includes front and rear wheels 22, 24 (e.g., a single front wheel 22 and a single rear wheel 24 aligned with the front wheel 22 to define a single track). The motorcycle 20 includes a frame structure having a main frame 28. A front fork 32 supports the front wheel 22 ahead of the main frame 28. The front fork 32 is rotatably coupled to a head tube 36 of the main frame 28. Handlebars 40 are coupled to the front fork 32 to allow a rider to control the orientation of the front fork 32 and the front wheel 22. A rear swingarm 44 supports the rear wheel 24 for rotation therein, the rear swingarm 44 enabling pivoting suspension movements of the rear wheel 24 and the swingarm 44 together relative to the main frame 28 about an axis A (FIG. 4). In addition to the pivoting support at the axis A, the swingarm 44 is coupled to the main frame 28 through a shock absorber unit 46 (e.g., including a coil spring and a hydraulic damper). The motorcycle 20 further includes at least one seat 48 (e.g., saddle seat(s) for operator and optionally pillion passenger) and at least one set of foot supports 50 (e.g., laterally extending foot pegs).

As illustrated, the motorcycle 20 is an electric motorcycle operable to drive by an electric powertrain including an electric power store 54 (e.g., battery pack) and an electric motor 58 electrically coupled to the power store 54 to convert stored electrical energy from the power store 54 into rotational kinetic energy for driving the motorcycle 20. As illustrated, the motor 58 powers the rear wheel 24 through an endless drive member 62 (e.g., belt or chain) in the form of a loop wrapped around a drive sprocket 66 (FIG. 4) and a driven sprocket 68 that is fixedly secured to the rear wheel 24. As discussed in further detail below, the drive sprocket 66 that drives the endless drive member 62 is positioned to rotate about the axis A. Further, the drive sprocket 66 is fixed to rotate integrally with an output shaft 70 of the electric motor 58 about the axis A. As such, the motorcycle 20 is provided without a multi-speed transmission between the electric motor 58 and the drive sprocket 66, and without any gearbox whatsoever. This may further be facilitated by providing the electric motor 58 as a high pole count motor having high torque density.

Figure 5:
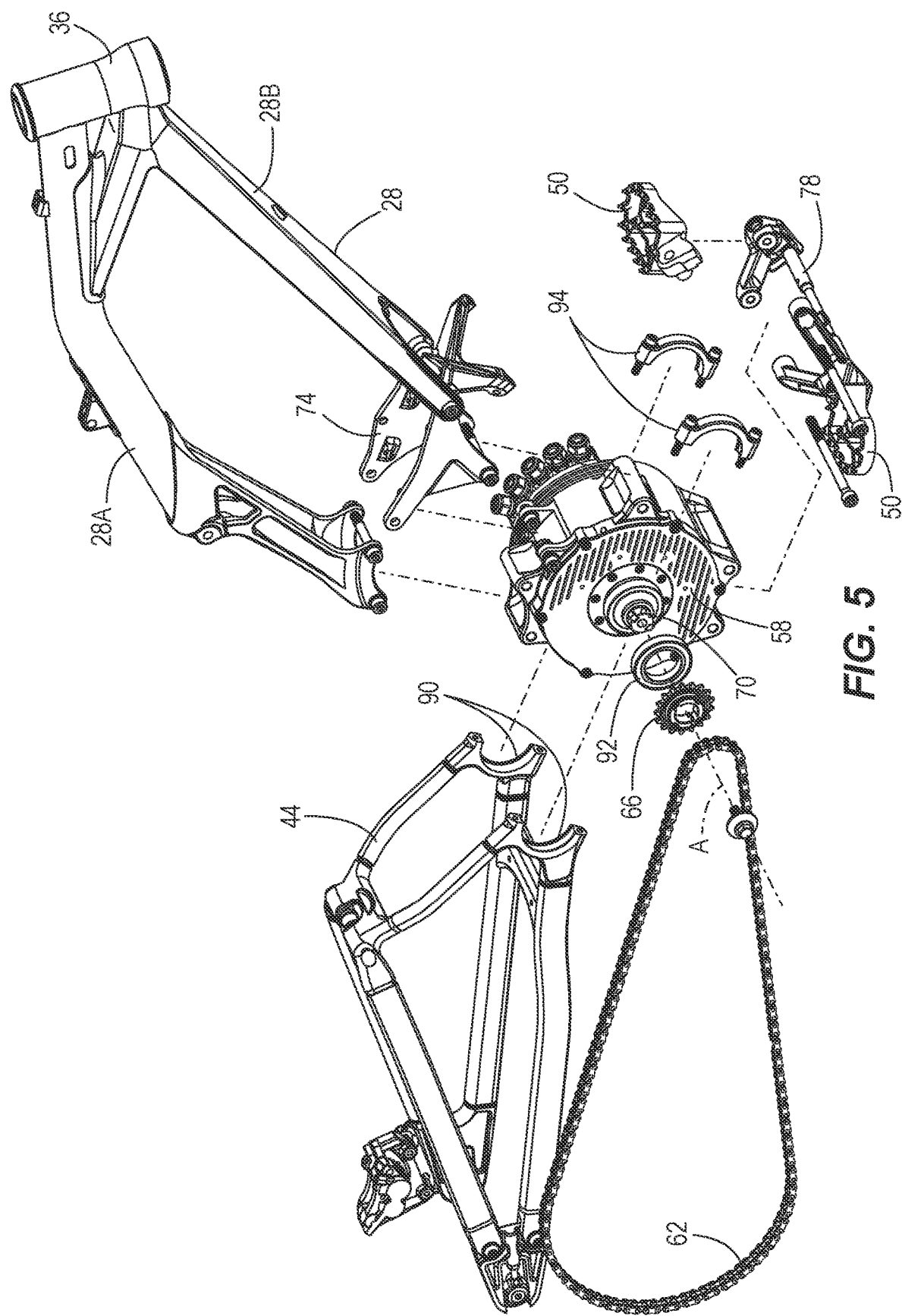
FIG. 5 is an exploded assembly view of the portion of the motorcycle shown in FIG. 4.

With particular reference to FIGS. 4 and 5, the electric motor 58 forms an integral stressed member of the motorcycle frame, which includes as the primary member the main frame 28. The main frame 28 includes a backbone 28A extending rearward and downward from the head tube 36 and a front down tube 28B extending rearward and downward from the head tube 36 below the backbone 28A. Both the backbone 28A and the front down tube 28B are coupled rigidly to the electric motor 58 (e.g., at an outer periphery thereof). The portions of the backbone 28A and the front down tube 28B connecting to the electric motor 58 are separate and spaced from each other to separately couple to the electric motor 58. The backbone 28A is directly coupled to the electric motor 58 (e.g., with multiple fastener joints at a top of the motor), and the front down tube 28B is coupled indirectly to the electric motor 58 (e.g., with an intermediate bracket 74 and a plurality of fasteners at a position on the motor that is forward of the coupling of the backbone 28A). For the coupling of the main frame 28, the electric motor 58 can be provided with a plurality of bosses 76 as shown in FIG. 5 (e.g., bosses formed at the radially outer edge of the motor and adapted to receive fasteners extending parallel with the axis A). However, one or more alternate couplings can be used in addition to or in lieu of the illustrated bosses 76. The portion of the intermediate bracket 74 coupled to the electric motor 58 is forked into spaced-apart left and right parts. Similarly, the bottom ends of both the back bone 28A and the front down tube 28B are also forked. It is also noted that, for example at a bottom portion thereof, the electric motor 58 provides one or more mounting locations for the foot supports 50 such that the foot supports 50 depend from the electric motor 58 rather than another part of the frame such as the main frame 28. As illustrated, the foot supports 50 include left and right foot pegs coupled to each other and to the electric motor 58 by a central foot support bracket 78 extending between the foot supports 50.

Figure 6:
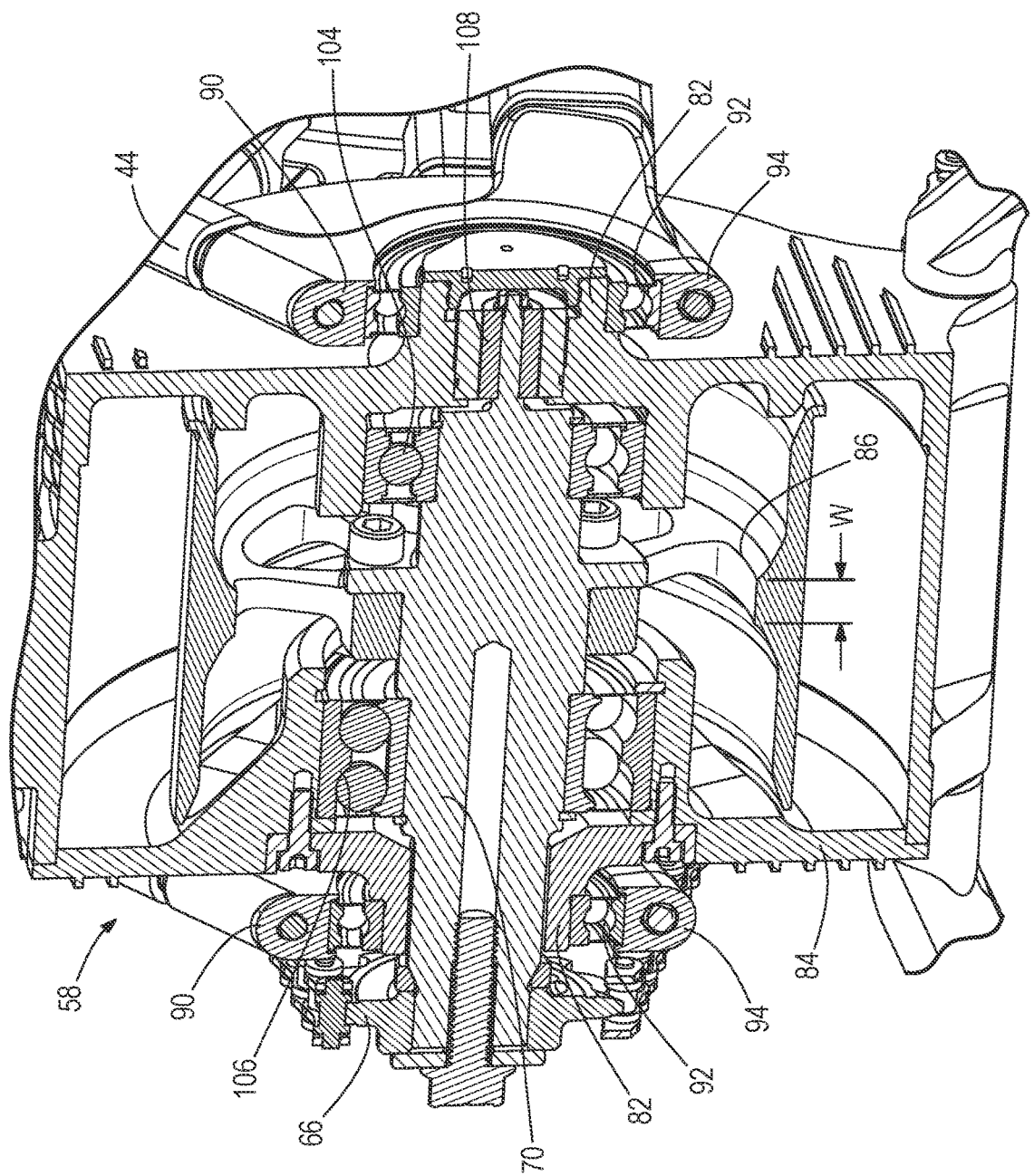
FIG. 6 is a cross-section of the motorcycle, taken along line 6-6 of FIG. 3.
Figure 7:
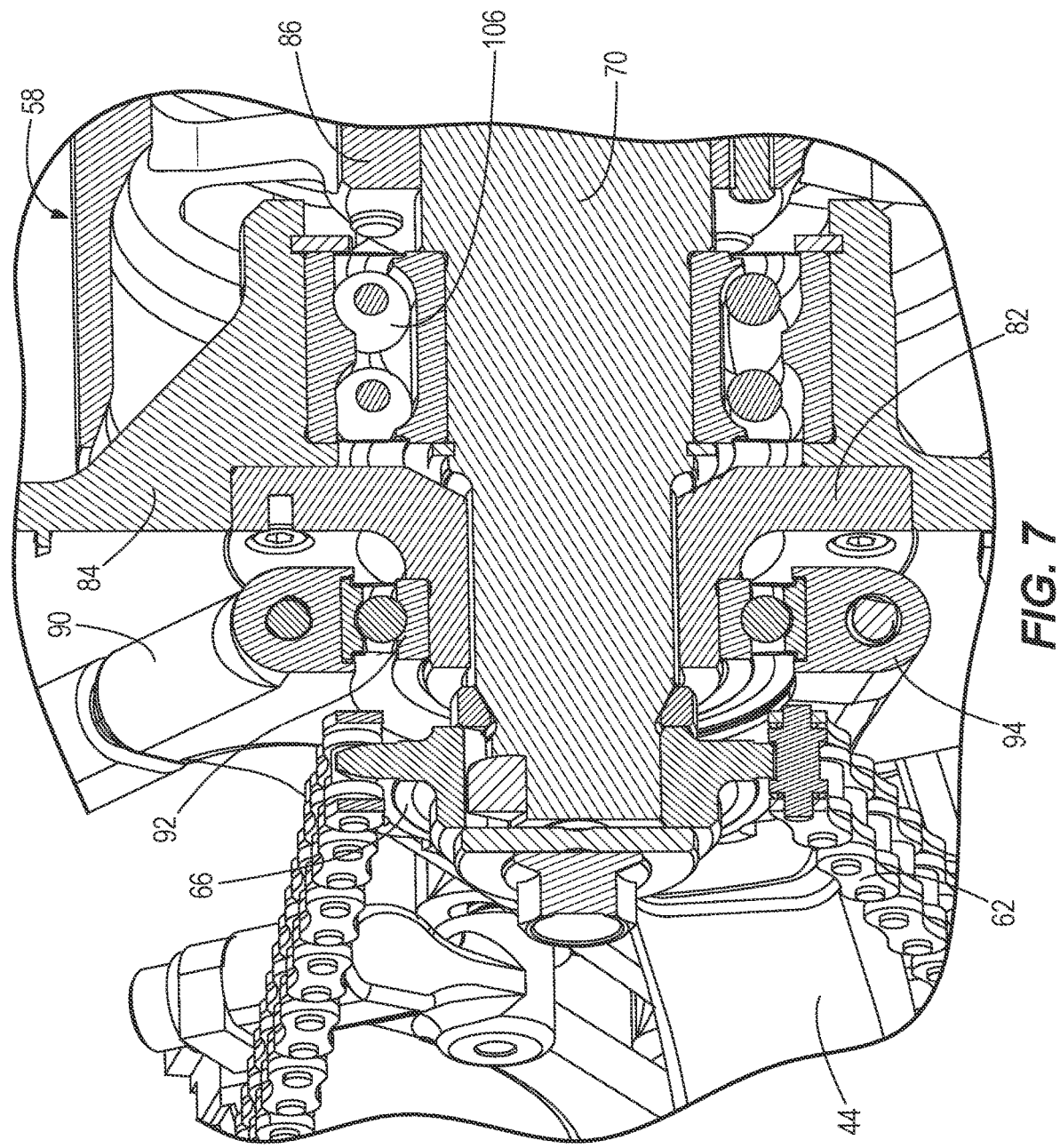
FIG. 7 is a detail view of an output side of the motor, taken from the cross-section of FIG. 6.

Turning now to the swingarm 44, and referring particularly to FIGS. 5 to 7, two pivoting joints between the swingarm 44 and the electric motor 58 are formed with respective cylindrical bosses 82 of a motor housing or case 84 provided to contain the motor's rotor 86. The rotor 86 is a rotating assembly, for example including permanent magnets, that is driven to rotate relative to a stator (not shown) and the motor case 84 when the motor 58 is energized. The case 84 can be formed in multiple pieces that join together for assembly, for example parallel to the axis A. In some constructions, the motor case 84 may fully or partially contain power electronics for communicating electric power from the power store 54 to the electric motor 58. The bosses 82 are formed to protrude axially beyond axial end faces (e.g., flat or flat, ribbed plates) of the case 84. As such, the bosses 82 may form the widest point of the case 84. As shown in FIGS. 6 and 7, the boss 82 on the drive side (rider's right as shown) may be formed as an insert separate from the portion of the case 84 that extends radially outward from the axis A to cover the rotor 86, although other constructions are optional. The output shaft 70 exits through the boss 82 on the drive side. On the non-drive side, the illustrated boss 82 is integrally formed with a portion of the case 84 that extends radially to the outer periphery of the case 84, and may also extend in a widthwise, axial direction over part or all of the rotor 86. At each swingarm joint, a front forked end portion 90 of the swingarm 44 is joined with the respective boss 82 (e.g., through a bearing 92 such as a roller bearing). Swingarm bearing clamps 94 are fastened to the front forked ends 90, around outer races of the bearings 92, to retain the swingarm 44 in position relative to the axis A. Each swingarm bearing clamp 94 includes features, such as a channel flanked by end flanges or shoulders, that position the swingarm 44 to the motor 58 as shown in FIG. 7. By the arrangement shown and described herein, the swingarm 44 is pivotably supported on the motor case 84 about the axis A, which is the axis of the rotor 86 and the output shaft 70 of the motor 58, along with the drive sprocket 66. Loads from the rear wheel 24 to the swingarm 44 are further transmitted to the main frame 28 only indirectly. In particular, loads at the swingarm 44 are transmitted through two possible paths: through the shock absorber unit 46 to a shock absorber mount 28C of the main frame 28, and through the motor case 84 to the main frame 28.

Figure 2:
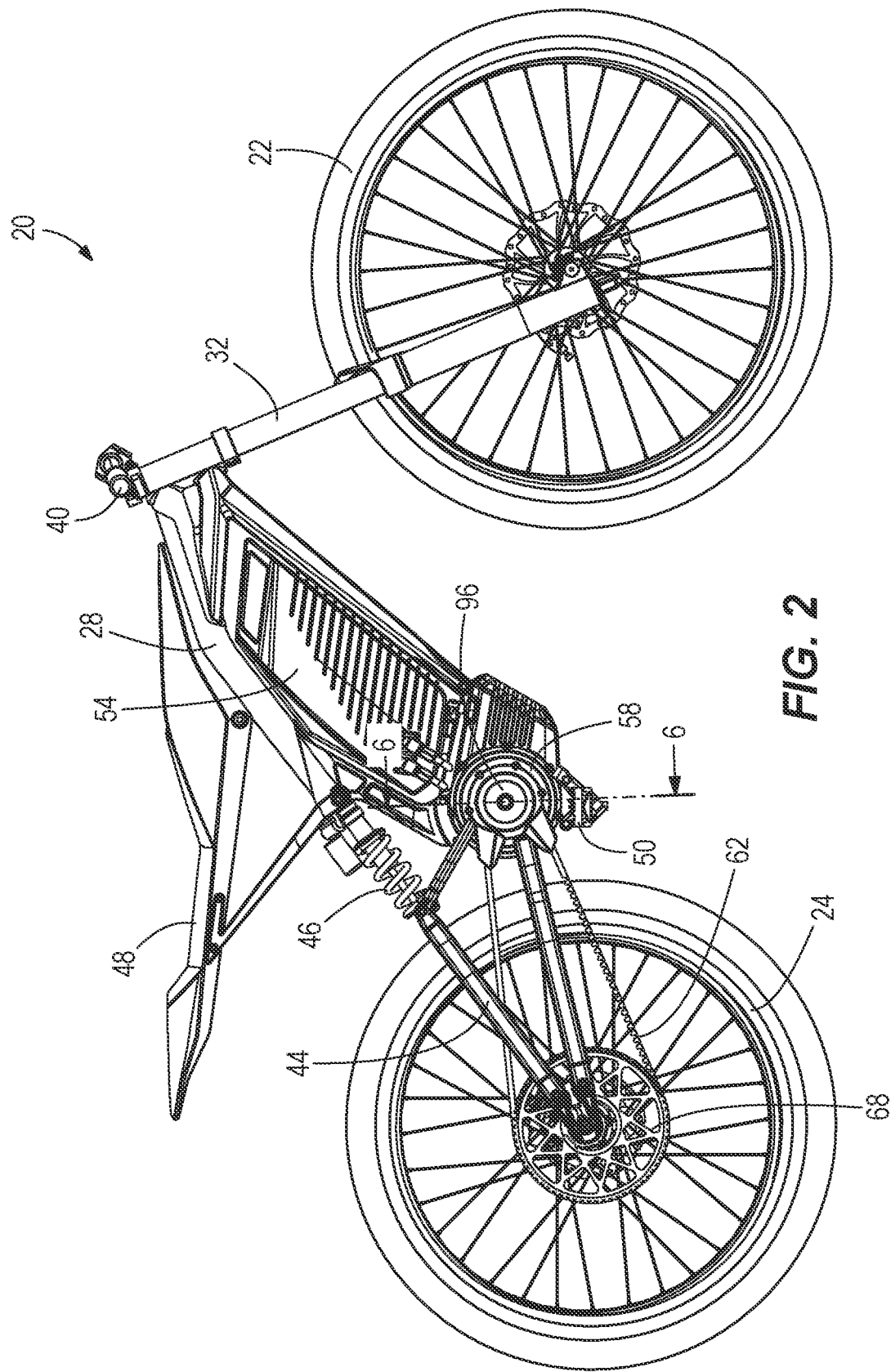
FIG. 2 is a right side view of the motorcycle of FIG. 1.
Figure 3:
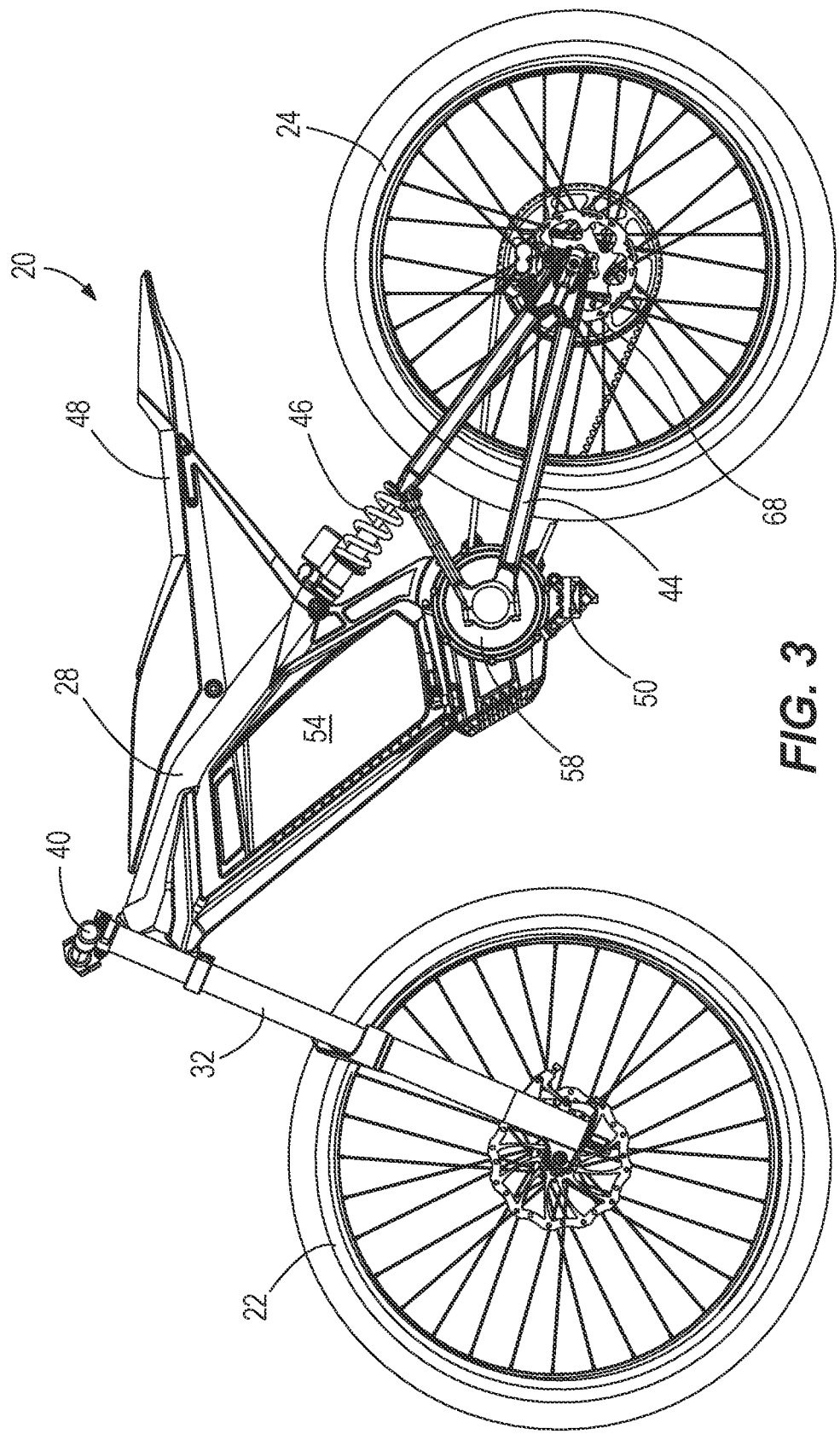
FIG. 3 is a left side view of the motorcycle of FIG. 1.

The swingarm joint on the drive side, along with the drive sprocket 66, is concealed partially or wholly by a cover 96 (FIGS. 1 and 2) secured to the motor case 84, although the cover 96 is removed for clarity in FIGS. 4-7. An additional enclosure 100 (FIGS. 1-3) directly forward of the electric motor 58 contains power electronics for providing the driving electric power signals to the motor 58. For example, one or any combination of: the motor inverter, the charger, and the DC/DC converter may be provided within the enclosure 100. The power electronics enclosure 100 can be provided by one or more individual pieces coupled to the motor 58, thus forming a motor assembly or power unit with integrated electronics.

As shown in FIG. 6, the rotor 86 within the motor 58 has a cross-sectional shape that is significantly wider in the axial direction at its outer radial ends, furthest from the axis A as compared with its inner radial portion. For example, the rotor 86 may have the cross-sectional shape of an "I" when sectioned along the axis A (i.e., a cross-section, as FIG. 6, taken along a plane that contains the axis A). The axially-measured rotor width W is a function of radius that increases by a factor of 4, 5 or more in the radial direction from the inner portion of the rotor 86 that is secured to the output shaft 70 to a widest point adjacent the radial outer end. As shown in FIG. 6, this shape creates large voids or pockets whereby first and/or second bearings 104, 106 can be at least partially nested into the rotor 86 (and in some cases fully nested therein). The first bearing 104 is provided on a side of the rotor 86 opposite the drive side. The second bearing 106 is provided on the drive side of the rotor 86, adjacent the drive sprocket 66. The second bearing 106 can have a larger load rating than the first bearing 104. The second bearing 106 can have a greater width than the first bearing 104 and/or a greater number of rows of rolling elements therein (e.g., single row vs. multi-row). The first and second bearings 104, 106 are the only bearings supporting the output shaft 70 relative to the case 84 and are positioned entirely within an exterior width profile of the case 84, even when measured to exclude the projection of the bosses 82. In some constructions, as shown, the axial end faces of the case 84 are flat radially outward of the bosses 82, and the first and second bearings 104, 106 are entirely between these two flat axial end faces. As shown in FIG. 6, a sensor 108 (e.g., rotational position sensor) for the motor 58 is positioned within the boss 82 on the non-drive side.

In the axial direction, the part of the swingarm 44 that is on the drive side is positioned between the adjacent axial end face of the motor case 84 and the drive sprocket 66. In other words, the drive sprocket 66 is positioned outboard of the swingarm pivot joint. A spacer ring 112 may be provided axially between the drive sprocket 66 and the swingarm pivot joint, and this may be the only component positioned axially therebetween. The spacer ring 112 can abut a shoulder on the output shaft 70 to set the correct position of the drive sprocket 66 for alignment with the driven sprocket 68 on the rear wheel 24. A bolt 116 threaded into the output shaft 70 secures the drive sprocket 66 to an axial end of the output shaft 70, with or without a separate washer. The drive sprocket 66 is splined, keyed or otherwise locked for integral rotation with the output shaft 70.

The above-described construction provides for an electric motorcycle motor 58 having an output axis A that is co-axial with the swingarm pivot axis. Furthermore, there is no separate pivot shaft for the swingarm 44 whatsoever, as the forward ends of the swingarm 44 interface with supporting portions (e.g., bosses 82) of the motor case 84, with only bearings 92 therebetween. Pivoting the swingarm 44 co-axially with the motor output axis A enables the motorcycle 20 to accommodate a wide range of suspension travel as it eliminates variation in center distance between the drive sprocket 66 and the driven sprocket 68 throughout the travel of the swingarm 44. Tension in the endless drive member 62 does not vary with suspension travel, and this improves durability while allowing the tension to be optimized for efficiency.

Various features and advantages of the invention are set forth in the following claims.

What is claimed is:

1. A motorcycle comprising:
   an electric motor having an output shaft defining a motor axis;
   a rear wheel drivably coupled to the electric motor to propel the motorcycle;
   a front wheel rotatably supported by a front fork;
   a swingarm rotatably supporting the rear wheel;
   a frame providing a head tube for supporting the front fork, and a pair of swingarm mounts for the swingarm to pivot coaxial with the motor axis, the pair of swingarm mounts including a drive side boss and a non-drive side boss; and
   a drive sprocket connected to an extended portion the output shaft at a position outboard of the drive side boss, the drive sprocket configured to drive the rear wheel through an endless drive member that extends rearward from the drive sprocket,
   wherein the output shaft has an intermediate portion extending through the drive side boss to the extended portion.

2. The motorcycle of claim 1, wherein one of the pair of swingarm mounts is integrally formed with a first end face of a case of the electric motor and the other of the pair of swingarm mounts is formed separately from a second end face of the case of the electric motor.

3. The motorcycle of claim 1, wherein a case of the electric motor is a stressed member of the frame.

4. The motorcycle of claim 3, wherein the frame includes a backbone and a front down tube, the two of which are independently secured to an outer periphery of the case of the electric motor.

5. The motorcycle of claim 1, wherein the output shaft has a diameter reduction from a portion inside the electric motor to the intermediate portion, and the output shaft has a further diameter reduction from the intermediate portion to the extended portion having the drive sprocket connected therewith.

6. The motorcycle of claim 1, further comprising first and second bearings supporting the output shaft in a case of the electric motor, the first and second bearings being flanked by the pair of swingarm mounts along the motor axis.

7. The motorcycle of claim 6, and wherein the second bearing supporting the output shaft is on a drive side with the drive side boss and the drive sprocket, and the second bearing is larger than the first bearing, which is positioned opposite the drive side.

8. A motorcycle comprising:
   an electric motor operable to propel the motorcycle, wherein a case of the electric motor enclosing a rotor thereof is a stressed frame member of the motorcycle and includes laterally-opposed first and second axial end faces;
   a drivetrain including a drive sprocket rotatable by the electric motor, a driven sprocket coupled to a rear wheel of the motorcycle, and an endless drive member extended between the drive sprocket and the driven sprocket;
   a swingarm defining a swingarm pivot axis at a forward end thereof, and supporting the rear wheel at a rearward end thereof; and
   a pair of swingarm mounts for pivotally supporting the forward end of the swingarm,
   wherein the swingarm pivot axis is also the axis of rotation of both the drive sprocket and the rotor of the electric motor,
   wherein one of the pair of swingarm mounts is integrally formed with the first axial end face of the electric motor case and another of the pair of swingarm mounts is formed separately from the second axial end face of the electric motor case.

9. The motorcycle of claim 8, wherein the drive sprocket is mounted on an output shaft of the electric motor.

10. The motorcycle of claim 1, wherein the endless drive member is a belt.

11. The motorcycle of claim 8, wherein the forward end of the swingarm includes left and right sides supported by the electric motor case with respective bearings to form respective swingarm pivots on the pivot axis.

12. The motorcycle of claim 8, further comprising a backbone frame member and a front down tube frame member, the two of which are independently secured to an outer periphery of the case of the electric motor.

13. The motorcycle of claim 8, further comprising first and second bearings supporting an output shaft of the electric motor with respect to the case thereof, the first and second bearings being flanked by the pair of swingarm mounts along the swingarm pivot axis.

14. The motorcycle of claim 13, and wherein the second bearing supporting the output shaft is on a drive side with the drive sprocket, and the second bearing is larger than the first bearing, which is positioned opposite the drive side.

15. The motorcycle of claim 13, wherein the output shaft has a diameter reduction from a portion inside the case to an intermediate portion that passes through one of the pair of swingarm mounts, and the output shaft has a further diameter reduction from the intermediate portion to an extended portion having the drive sprocket connected therewith.

16. The motorcycle of claim 8, wherein the drive sprocket is situated along the swingarm pivot axis at a position outboard of the swingarm.

17. The motorcycle of claim 16, wherein the endless drive member is a belt.

18. A motorcycle comprising:
    an electric motor operable to propel the motorcycle, wherein a case of the electric motor includes two opposing axial end faces defining a cavity enclosing a rotor of the electric motor and a portion of an output shaft extending concentric with the rotor;
    a drivetrain including a drive sprocket secured for rotation with an extended portion of the output shaft, a driven sprocket secured for rotation with a rear wheel of the motorcycle, and an endless drive member extended between the drive sprocket and the driven sprocket;
    a swingarm supporting the rear wheel, wherein a pivot axis of the swingarm on the motorcycle is concentric with an axis of rotation of the output shaft and the drive sprocket; and
    a first bearing and a second bearing supporting the output shaft for rotation in the case, wherein the output shaft extends outward from the first bearing to a rotational position sensor, and wherein the output shaft extends outward from the second bearing to support the drive sprocket,
    wherein the case of the electric motor is a stressed frame member of the motorcycle.

19. The motorcycle of claim 18, wherein the second bearing is larger than the first bearing.

20. The motorcycle of claim 18, wherein the output shaft has a diameter reduction from a portion inside the case to an intermediate portion that passes through a swingarm mount and a forward end of the swingarm supported thereon, and the output shaft has a further diameter reduction from the intermediate portion to the extended portion secured to the drive sprocket.

21. The motorcycle of claim 18, wherein the endless drive member is a belt.

22. The motorcycle of claim 18, wherein the swingarm includes left and right forward ends supported on respective swingarm mounts flanking respective left and right axial end faces of the electric motor case, and wherein at least one of the swingarm mounts is provided directly by a boss of the electric motor case.

23. A motorcycle comprising:
an electric motor having an output shaft defining a motor axis;
a rear wheel drivably coupled to the electric motor to propel the motorcycle;
a front wheel rotatably supported by a front fork;
a swingarm rotatably supporting the rear wheel;
a head tube for supporting the front fork; and
a battery pack positioned between the electric motor and the head tube, wherein the battery pack is inclined forwardly to extend substantially straight between the electric motor and the head tube,
wherein a case of the electric motor is a stressed frame member between the head tube and the swingarm, and
wherein the swingarm is coupled to the case of the electric motor to define a swingarm pivot axis that is co-axial with the motor axis.

24. The motorcycle of claim 23, wherein in a side view, a forward side of the battery pack extends substantially linearly between the electric motor and the head tube.

25. The motorcycle of claim 23, wherein in a side view, a forward side of the battery pack and an opposite rearward side are substantially parallel.

26. A motorcycle comprising:
a frame;
an electric motor having an output shaft defining a motor axis;
a rear wheel drivably coupled to the electric motor to propel the motorcycle; and
a swingarm rotatably supporting the rear wheel,
wherein a case of the electric motor is a stressed member of the frame,
wherein the case includes first and second opposed axial end faces, and
wherein each of the first and second opposed axial end faces includes a boss that protrudes axially outwardly of the case, and wherein the bosses define swingarm mounts for the swingarm to pivot coaxial with the motor axis.

27. The motorcycle of claim 26, wherein frame includes a main frame, and the case of the electric motor provides the only structural load path of the frame between the swingarm mounts and the main frame.

28. The motorcycle of claim 27, further comprising a shock absorber connected between the swingarm and a shock absorber mount the main frame.

29. The motorcycle of claim 26, further comprising a sprocket coupled for rotation with the output shaft, the sprocket configured to drive the rear wheel through an endless drive member on a drive side of the electric motor, wherein the sprocket is situated axially outward of one of the swingarm mounts on the drive side of the electric motor.

30. The motorcycle of claim 29, wherein the endless drive member is a belt.

\* \* \* \* \*